United States Patent
Park

(10) Patent No.: US 7,607,727 B2
(45) Date of Patent: Oct. 27, 2009

(54) ARMREST LOCKING DEVICE

(75) Inventor: Hyungsang Park, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 210 days.

(21) Appl. No.: 11/689,184

(22) Filed: Mar. 21, 2007

(65) Prior Publication Data

US 2008/0129101 A1 Jun. 5, 2008

(30) Foreign Application Priority Data

Dec. 4, 2006 (KR) .................. 10-2006-0121379

(51) Int. Cl.
*A47C 7/62* (2006.01)
*E05C 19/12* (2006.01)

(52) U.S. Cl. .............. 297/188.19; 292/131; 292/231; 296/37.8

(58) Field of Classification Search ........... 297/188.19; 292/131 X, 231; 296/37.8, 37.13
See application file for complete search history.

(56) References Cited

U.S. PATENT DOCUMENTS

| 5,810,434 | A  | * | 9/1998  | Thompson et al. ..... 297/188.19 |
| 6,616,206 | B2 | * | 9/2003  | Luginbill et al. ....... 297/188.19 |
| 6,761,382 | B2 | * | 7/2004  | Ji et al. .................. 292/131 X |
| 6,966,583 | B2 | * | 11/2005 | Ji et al. .................. 292/231 |
| 7,114,772 | B2 | * | 10/2006 | Kobayashi et al. ..... 297/188.19 |
| 2006/0152037 | A1 | | 7/2006  | Dry et al. |
| 2006/0258440 | A1 | | 11/2006 | Vitito |
| 2006/0273647 | A1 | | 12/2006 | Omori |

* cited by examiner

*Primary Examiner*—Anthony D Barfield
(74) *Attorney, Agent, or Firm*—Greenblum & Bernstein, P.L.C.

(57) ABSTRACT

An armrest locking device for preventing unintentional unlocking thereof upon a car crash is disclosed. The armrest locking device includes an armrest body defining a receiving space therein, an armrest cover pivotally rotatably coupled to the armrest body for opening and closing the armrest body, a push button provided at the armrest cover for regulating locking and unlocking of the armrest, a hook member configured to move along with the push button, so as to be caught by the armrest body, an elastic member provided at the rear side of the push button for providing the push button with an elastic force in a protruding direction of the push button, and a sensor member having a rotating shaft pivotally rotatably disposed in a space defined at the rear side of the hook member, a supporting portion for supporting the hook member, and a weight connected to the rotating shaft.

7 Claims, 5 Drawing Sheets

ARMREST LOCKING DEVICE

BACKGROUND OF THE INVENTION

1. Field of the Invention

The present invention relates to an armrest locking device, and more particularly, to an armrest locking device having no risk of unintentional unlocking upon a car crash.

2. Description of the Related Art

In accordance with a regulation of Korean safety standards related to interior compartment doors of automobiles, a locking device for an automobile interior receiving structure, for example, an armrest locking device, has to be designed so as not to be opened upon a car crash.

To fulfill the above regulation, there has been suggested in the prior art that a button spring as one component of the locking device has a high strength sufficient to overcome an inertia moment produced by weights of a push button and a hook. However, using the high-strength button spring makes for a user to press the push button with a great force even in a normal use situation and therefore, may result in a degradation in the convenience of passengers and the merchantability of automobiles.

FIG. 1 is a sectional view illustrating the configuration of a conventional armrest locking device, and FIG. 2 is a sectional view illustrating a state in which a push button of the conventional armrest locking device is retracted by a rear crash shock.

As shown, the conventional armrest locking device includes an armrest body 10 defining a receiving space therein, an armrest cover 20 for opening and closing the armrest body 10, a push button 30 for regulating locking and unlocking of the armrest cover 20, a hook member 35 configured to move along with the push button 30, and an elastic member 32 for supporting the push button 30.

The armrest cover 20 is coupled to the armrest body 10 by use of a hinge 22, to have a pivotally rotatable structure. The push button 30 is disposed at a front surface of the armrest cover 20 such that the push button 30 is retractable by manual operation of a user. The push button 30 is able to be returned to an original position thereof by a restoration force of the elastic member 32.

If the push button 30 is pressed, the hook member 35 is pushed rearward of the armrest body 10 as the elastic member 32 is constricted, resulting in unlocking of the armrest locking device.

With this configuration, it will be appreciated that the higher the strength of the elastic member 32, a greater force should be applied to press the push button 30, whereas the lower the strength of the elastic member 32, the push button 30 is able to be easily pressed even by a smaller force.

Meanwhile, interior compartment doors of an automobile have a regulation in that the doors should not be opened upon a car crash.

In particular, a rear car crash is problematic. As shown in FIG. 2, if an automobile has a rear crash, the push button 30 is pushed rearward by an inertia force. However, if the push button 30 is pushed rearward beyond a predetermined distance upon receiving a crash shock, the armrest locking device may experience an unintentional unlocking and therefore, have a difficulty to fulfill the above described safety regulation.

Accordingly, there has been conventionally suggested to provide the elastic member 32 with a high strength, so as to prevent the push button 30 from being unintentionally pushed rearward. However, the elastic member 32 having the high strength makes for a user to apply a great force to the push button 30 for opening of an armrest and this is undesirable in the viewpoints of the operating performance of the armrest locking device and the convenience of use.

SUMMARY OF THE INVENTION

Therefore, it is an aspect of the present invention to provide an armrest locking device, which can fulfill a safety regulation in that the armrest locking device has no risk of unintentional unlocking upon a car crash without a degradation in the convenience of use.

In accordance with the present invention, the above and other aspects can be accomplished by the provision of armrest locking device comprising: an armrest body defining a receiving space therein; an armrest cover pivotally rotatably coupled to the armrest body for opening and closing the armrest body; a push button provided at the armrest cover for regulating locking and unlocking of an armrest; a hook member configured to move along with the push button, so as to be caught by the armrest body; an elastic member provided at the rear side of the push button for providing the push button with an elastic force in a protruding direction of the push button; and a sensor member having a rotating shaft pivotally rotatably disposed in a space defined at the rear side of the hook member, a supporting portion for supporting the hook member, and a weight connected to the rotating shaft.

Preferably, the supporting portion of the sensor member obstructs retraction of the hook member if the weight is moved rearward, and the weight includes an arm portion and a weight portion.

Preferably, the rotating shaft of the sensor member is rotatably coupled to a supporting shaft portion provided at the rear side of the hook member, and the supporting shaft portion has an inclined surface for restricting a rotation angle of the sensor member. Preferably, the rotation angle of the sensor member, restricted by the inclined surface, is within a range of 40 to 70 degrees.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
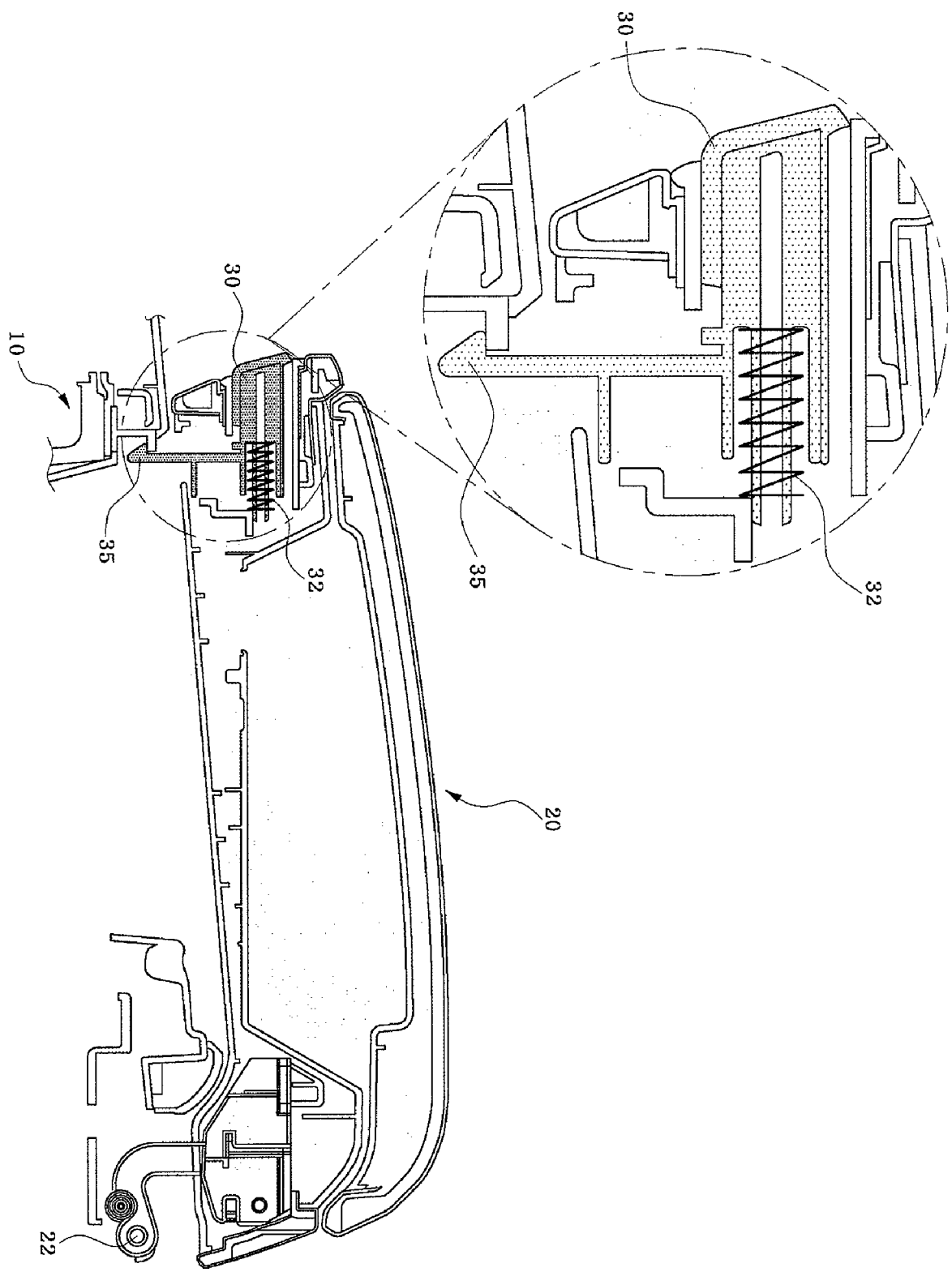
FIG. 1 is a sectional view illustrating the configuration of a conventional armrest locking device.
Figure 2:
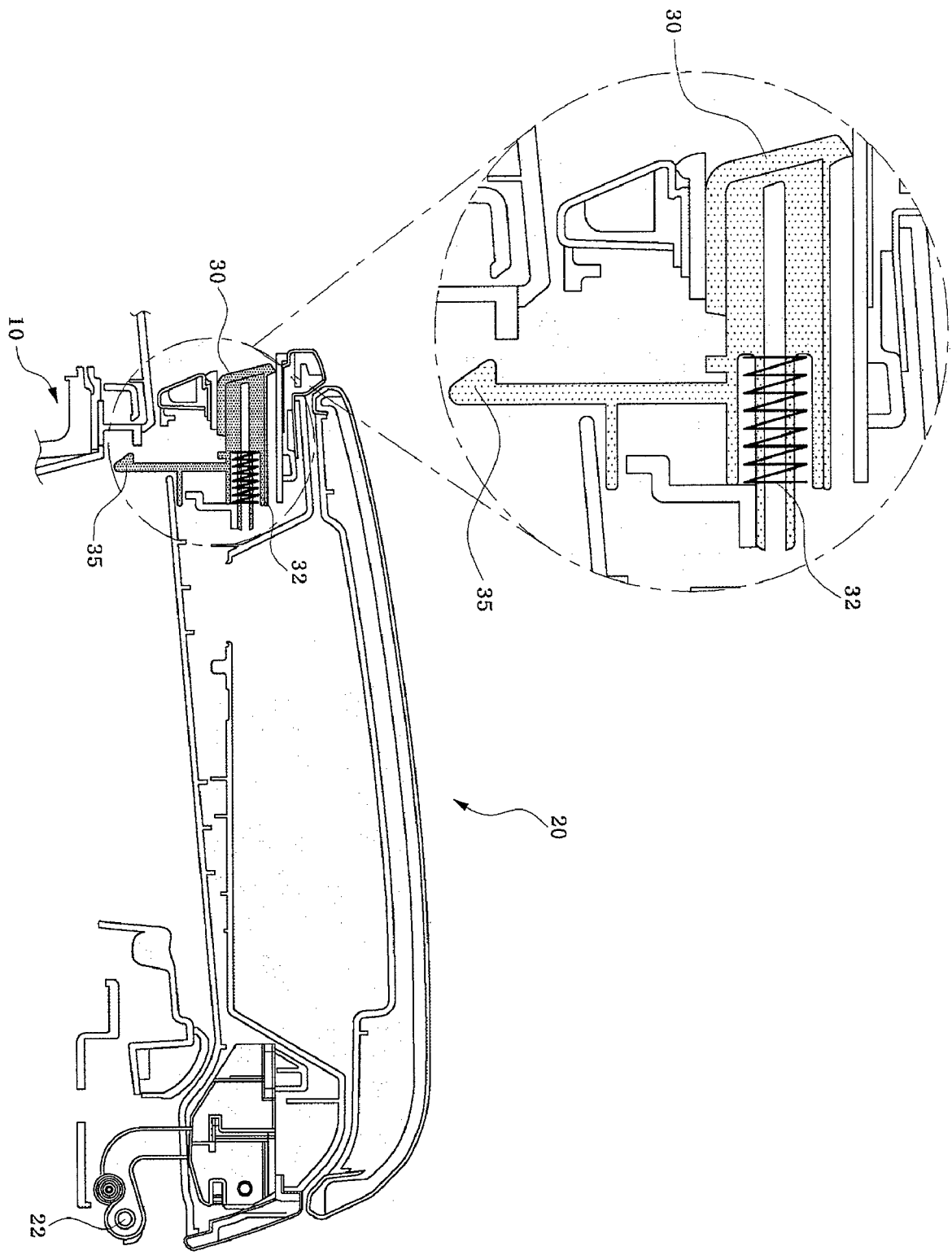
FIG. 2 is a sectional view illustrating a state wherein a push button of the conventional armrest locking device is retracted by a rear crash shock.

Now, an armrest locking device according to an exemplary embodiment of the present invention will be described in detail with reference to the accompanying drawings.

For the sake of convenience for explanation, the thickness of lines or the size of constituent elements shown in the drawings may be illustrated exaggeratingly for the clarity and convenience of description. Also, the terms of constituent elements, which will be described hereinafter, are defined in consideration of their functions in the present invention and may be changed according to the intention of a user or an operator, or according to the custom. Accordingly, definitions of these terms must be based on the overall description herein.

Figure 3:
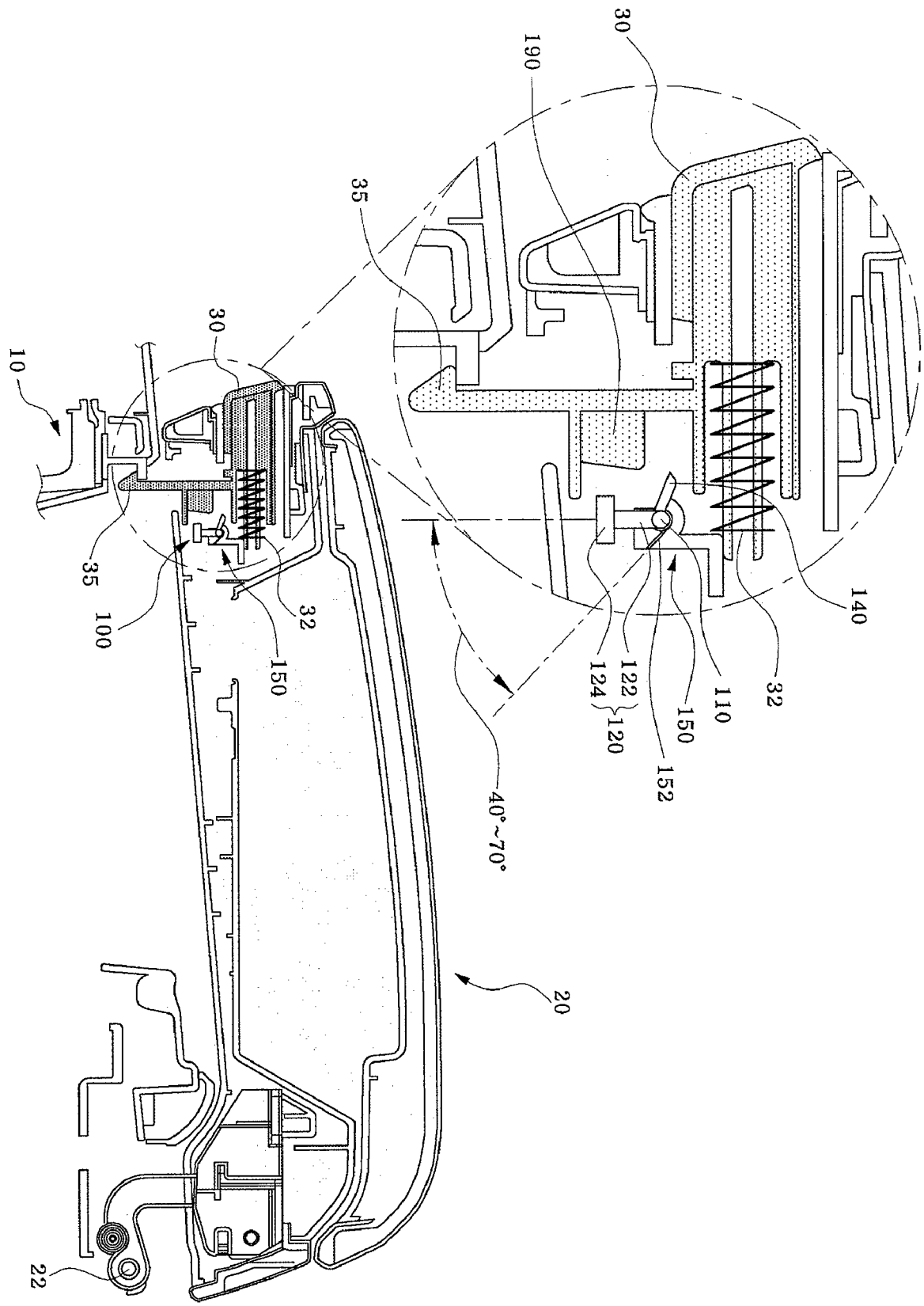
FIG. 3 is a sectional view illustrating the configuration of an armrest locking device according to an exemplary embodiment of the present invention.
Figure 5:
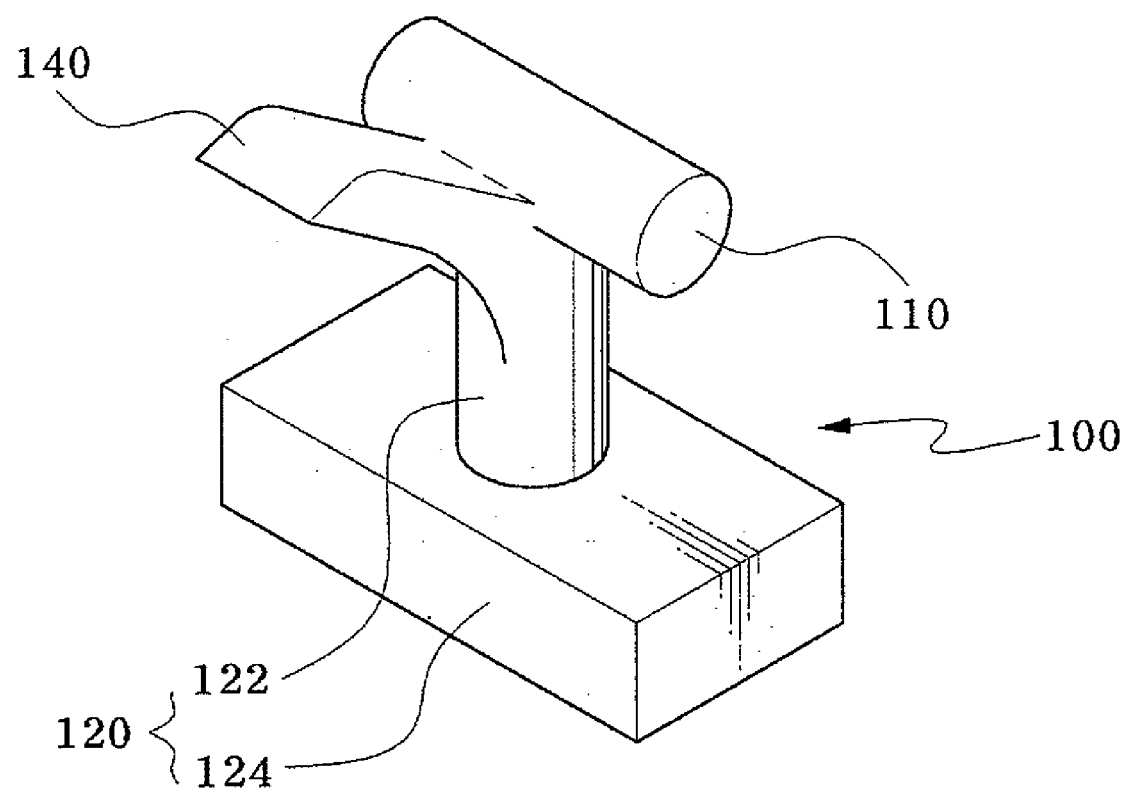
FIG. 5 is a perspective view illustrating a sensor member according to the exemplary embodiment of the present invention.

FIG. 3 is a sectional view illustrating the configuration of an armrest locking device according to an exemplary embodiment of the present invention, and FIG. 5 is a perspective view illustrating a sensor member according to the exemplary embodiment of the present invention.

As shown, the armrest locking device according to the exemplary embodiment of the present invention includes an armrest body 10 defining a receiving space therein, an armrest cover 20 for opening and closing the armrest body 10, the armrest cover 20 being pivotally rotatably coupled to the armrest body 10, a push button 30 provided at the armrest cover 20 for regulating locking and unlocking of an armrest, a hook member 35 integrally formed with the push button 30 so as to be caught by the armrest body 10, and a sensor member 100 configured to be rotated by an inertia force, so as to prevent retraction of the hook member 35 upon a rear car crash.

As shown in FIG. 5, the sensor member 100 includes a rotating shaft 110, a weight 120, and a supporting portion 140. The rotating shaft 110 is pivotally rotatably coupled to a supporting shaft portion 150 that is disposed in a space behind the hook member 35. The weight 120 is connected to the rotating shaft 110 and includes an arm portion 122 and a weight portion 124. The arm portion 122 is a portion for connecting the weight portion 124 to the rotating shaft 110, and the weight portion 124 is a portion on which a weight of the sensor member 100 is concentrated for allowing the sensor member 100 to be rotated by an inertia force. Preferably, the weight portion 124 is spaced apart from the rotating shaft 110 by a predetermined distance, in order to produce a sufficient rotational torque of the sensor member 100. For this, the arm portion 122 is provided to obtain the predetermined distance between the weight portion 124 and the rotating shaft 110.

The supporting shaft portion 150 has an inclined surface 152 for supporting a rear side of the arm portion 122. The inclined surface 152 serves to set a rotation limit of the sensor member 100 upon a rear car crash. In other words, if a rear car crash occurs, the sensor member 100 is rotated until the arm portion 122 comes into contact with the inclined surface 152. The inclined surface 152 preferably has an inclination angle of 40 to 70 degrees relative to a vertical direction.

The angle of the inclined surface 152 means a rotation angle of the sensor member 100. When an automobile travels on a slope road or is parked on the slope road, the sensor member 100 has the same rotation angle as an inclination angle of the road. Generally, the inclination angle of the slope road, where an automobile travels or is parked, is smaller than 40 degrees. Therefore, by setting the angle of the inclined surface 152 within a range of 40 to 70 degrees, it is possible to prevent the supporting portion 140 from hindering retraction of the hook member 35 during the traveling or parking of the automobile on the slope road.

When an automobile travels on a leveled ground or is parked on the leveled ground, as shown in FIG. 3, the weight 120 is vertically oriented under the influence of gravity, and therefore, the supporting portion 140 is disposed in a space above a protruding piece 190 of the hook member 35. Accordingly, there is provided a space for allowing the push button 30 to be pressed and thus, operation of the locking device has no intervention.

The protruding piece 190 extends rearward from the hook member 35 and substantially is a portion supported by the supporting portion 140. A space defined between the supporting portion 140 and the weight 120 is usually located behind the protruding piece 190. Then, if the sensor member 100 is rotated by an inertia force, the supporting portion 140 of the sensor member 100 is moved downward, thereby serving to prevent the retraction of the protruding piece 190.

Figure 4:
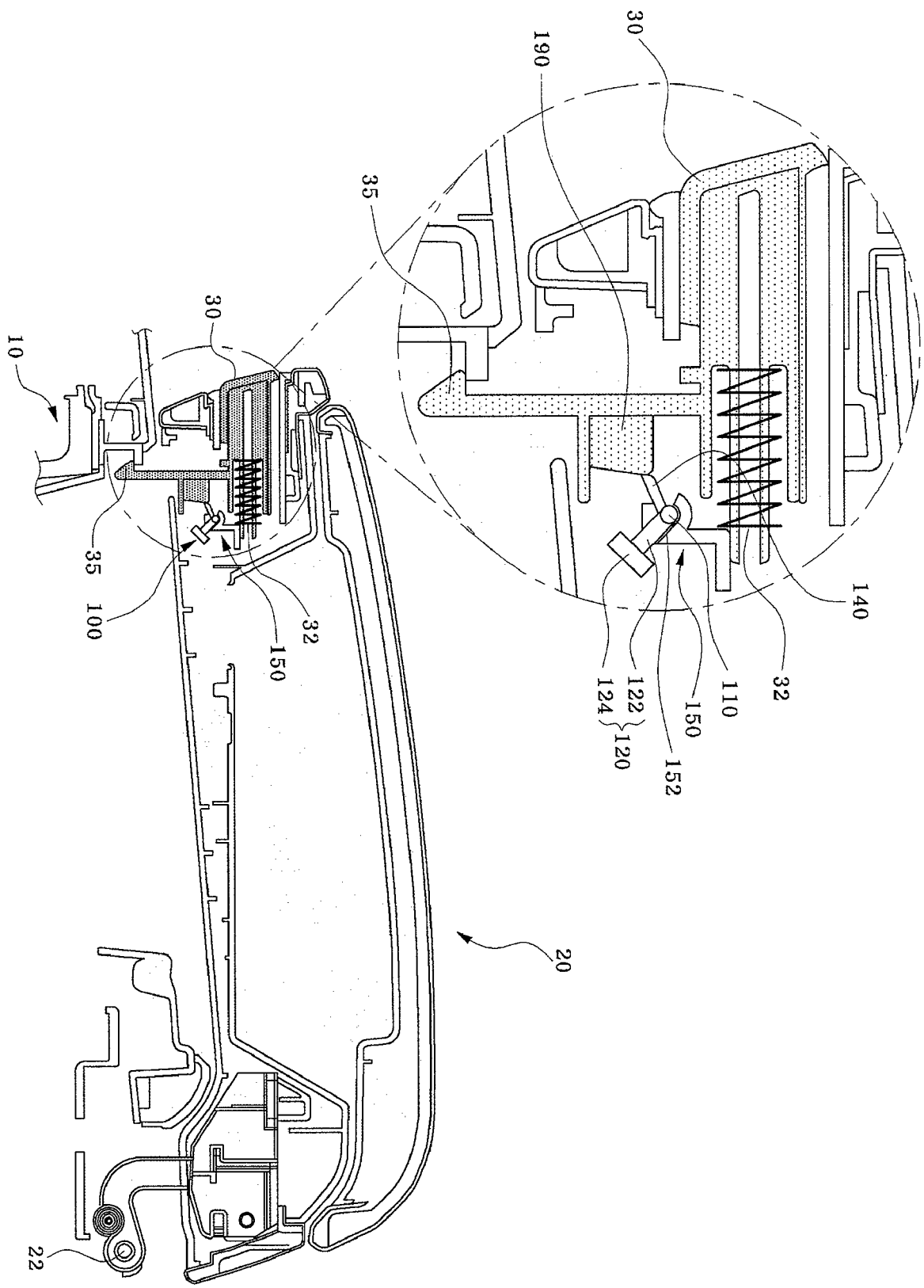
FIG. 4 is a sectional view illustrating the operation of the armrest locking device according to the exemplary embodiment of the present invention upon a rear car crash situation.

FIG. 4 is a sectional view illustrating the operation of the armrest locking device according to the exemplary embodiment of the present invention upon a rear car crash situation.

As shown, if an automobile has a rear crash, the weight 120 is rotated rearward (i.e. is rotated counterclockwise) by an inertia force. In this case, the weight 120 is rotated until the arm portion 122 of the weight 120 comes into contact with the inclined surface 152. With the rotation of the weight 120, the supporting portion 140 is moved downward to thereby come into contact with the protruding piece 190.

Although the push button 30 is affected by an inertia force to thereby be forced so as to be retracted, the protruding piece 190 of the hook member 35 is supported by the supporting portion 140. Therefore, the push button 30 is able to be supported so as not to be retracted. Even if a great inertia force is applied to the push button 30, although a force, which is applied to the supporting portion 140 by the protruding piece 190, acts to rotate the sensor member 100 counterclockwise, there is no further retraction of the push button 30 because the arm portion 122 of the sensor member 100 is supported by the inclined surface 152.

Of course, although the inertia force is simultaneously applied to the push button 30 and the sensor member 100, the push button 30 is supported by the elastic member 32 and the weight of the push button 30 is larger than that of the sensor member 100. Therefore, the push button 30 has a slower movement speed than that of the sensor member 100. Furthermore, since the sensor member 100 is rapidly rotatable without a separate resistance, the above described operation can be accomplished.

As apparent from the above description, the present invention provides an armrest locking device, which has the effect of fulfilling a regulation in that interior compartment doors of an automobile should not be opened unintentionally upon a car crash without a degradation in the convenience of use.

Although the exemplary embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An armrest locking device comprising:

an armrest body defining a receiving space therein;

an armrest cover pivotally rotatably coupled to the armrest body to open and close the armrest body;

a push button provided at the armrest cover to regulate locking and unlocking of the armrest;

a hook member configured to move along with the push button, so as to be caught by the armrest body;

an elastic member provided at the rear side of the push button to provide the push button with an elastic force in a protruding direction of the push button; and a sensor member having a rotating shaft pivotally rotatably disposed in a space defined at the rear side of the hook member, a supporting portion configured to obstruct retraction of the hook member upon a rear crash of an automobile, and a weight connected to the rotating shaft.

2. The armrest locking device according to claim 1, wherein the weight includes an arm portion and a weight portion.

3. The armrest locking device according to claim 1, wherein the hook member is integrally formed with the push button.

4. The armrest locking device according to claim 1, wherein the hook member has a protruding piece extending toward the sensor member.

5. An armrest locking device comprising:
an armrest body defining a receiving space therein;
an armrest cover pivotally rotatably coupled to the armrest body to open and close the armrest body;
a push button provided at the armrest cover to regulate locking and unlocking of the armrest;
a hook member configured to move along with the push button, so as to be caught by the armrest body;
an elastic member provided at the rear side of the push button to provide the push button with an elastic force in a protruding direction of the push button;
a sensor member having a rotating shaft pivotally rotatably disposed in a space defined at the rear side of the hook member, a supporting portion configured to support the hook member, and a weight connected to the rotating shaft, and
wherein the supporting portion of the sensor member obstructs retraction of the hook member if the weight is moved rearward.

6. An armrest locking device comprising:
an armrest body defining a receiving space therein;
an armrest cover pivotally rotatably coupled to the armrest body to open and close the armrest body;
a push button provided at the armrest cover to regulate locking and unlocking of the armrest;
a hook member configured to move along with the push button, so as to be caught by the armrest body;
an elastic member provided at the rear side of the push button to provide the push button with an elastic force in a protruding direction of the push button;
a sensor member having a rotating shaft pivotally rotatably disposed in a space defined at the rear side of the hook member, a supporting portion configured to support the hook member, and a weight connected to the rotating shaft, and
wherein the rotating shaft of the sensor member is rotatably coupled to a supporting shaft portion provided at the rear side of the hook member, and the supporting shaft portion has an inclined surface to restrict a rotation angle of the sensor member.

7. The armrest locking device according to claim 6, wherein the rotation angle of the sensor member, restricted by the inclined surface, is within a range of 40 to 70 degrees.

* * * * *